H. C. CONROY.
AUXILIARY BRAKE.
APPLICATION FILED JULY 11, 1912.

1,067,586.

Patented July 15, 1913.

Witnesses.
N. Brandt.
Thomas Colson.

Inventor:
Harry C. Conroy.
By Joshua R. H. Potts
his Attorney.

UNITED STATES PATENT OFFICE.

HARRY C. CONROY, OF CHICAGO, ILLINOIS.

AUXILIARY BRAKE.

1,067,586.

Specification of Letters Patent. Patented July 15, 1913.

Application filed July 11, 1912. Serial No. 708,826.

*To all whom it may concern:*

Be it known that I, HARRY C. CONROY, a citizen of the United States, and a resident of the city of Chicago, county of Cook, and State of Illinois, have invented certain new and useful Improvements in Auxiliary Brakes, of which the following is a specification.

My invention relates to car brakes and particularly to the class of said brakes which utilize the movement of the car in their operation, and the object of this improvement is to provide a device of this character which will be simple of construction and efficient in operation.

Other objects will appear hereinafter.

The invention consists in the combinations and arrangements of parts hereinafter described and claimed.

The invention will be best understood by reference to the accompanying drawings forming a part of this specification, and in which—

Figure 1:
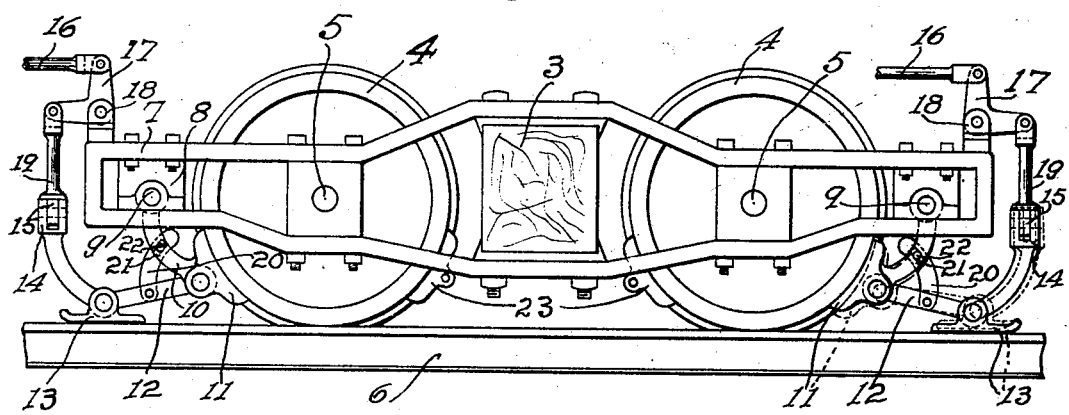
Figure 2:
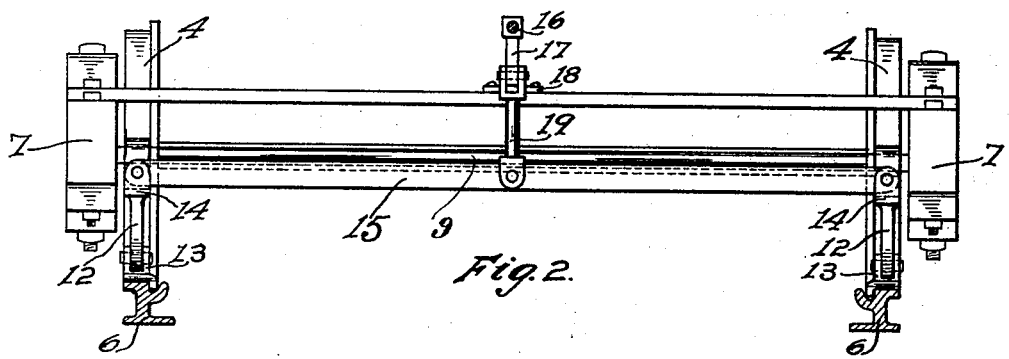

Figure 1 is a side elevation of a truck of a car equipped with my improvement, and Fig. 2 is a front elevation of the same.

The preferred form of construction, as illustrated in the accompanying drawings, comprises a car truck 3 carried by conventional wheels 4 and axles 5, and mounted on a track 6. At each end of the truck 3 are provided extensions 7 on which are pivotally mounted sets of brakes, so that one set will be used when the car is traveling in one direction, and the other set when the car is traveling in the opposite direction. Each set of brakes is similar in construction and operation, and the description of one set will answer for both. Rigidly secured on the extension 7 are bearings 8 in which are journaled shafts 9. The shafts 9 may be dispensed with, when so desired, and short studs used instead. Pivotally mounted on one of the shafts 9 are a pair of arms 10 and on the lower end of the arms 10 is carried a brake shoe 11, which is adapted, to engage a car wheel 4.

The levers 12 are pivotally mounted on the lower ends of the arms 10 at a point near the brake shoes 11 and at intermediate portions on said levers are pivotally mounted the brake shoes 13, which are adapted to engage the track 6.

The ends 14 of the levers 12 are joined by means of the brake beam 15 in a manner to operate the pair of levers 12 simultaneously with a single source of power. Any suitable source of power, not shown, may be used and such force applied through the rod 16, bell crank lever 17, connecting rod 19 and the brake beam 15 to actuate said brakes. The bell crank lever 17 is mounted on suitable bearing 18 secured to the extension 7, in a manner such as illustrated in the drawings.

The pivotal movement of the arms 10 and levers 12 is limited by means of connecting links 20, one connecting link connecting each of the arms 10 with its co-acting lever 12 in the manner illustrated. Said connecting link 20 is connected with the lever 12 by means of a pivotal connection and the arm 10 is provided with a pin 22 adapted to engage the slot 21 formed in the connecting link 20. The slot 21 is of such length that upon upward movement of the levers 12, the pin 22 will engage the lower end of the slot 21 to insure disengagement of the brake shoes 11 from their contact with the wheels 4. The pin 22 will engage the upper end of the slot 21 in a manner to limit the pivotal movement of the arms 10 and levers 12, when the brake is applied, to prevent the truck from climbing on the brakes.

The conventional brakes 23 may also be provided on the truck, when so desired, and my device used for an emergency brake or in instances where the ordinary brakes are not sufficient. I prefer to actuate the brakes from a separate source of energy, such as furnishing a separate brake cylinder to operate the rod 16.

The brakes in my device are operated by means of forcing the brake beam 15 downwardly, thereby engaging the brakes 13 with the track 6 and the friction between such brake shoes 13 and track 6, will, with the movement of the car, cause the brake shoes 11 to contact with the wheels 4, thereby effectually braking the car. The connecting links 20 will prevent the forward end of the truck 3 from rising and lifting the forward wheels 4 from the track.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. The combination with a car frame; of arms, each pivoted at one end on said frame, a wheel brake carried on the other end of each of said arms; levers, each pivoted at one of its ends on one of said arms; a track brake pivoted at an intermediate point on each of said levers; and connecting links, each having a pivotal connection with one of said levers, and a slot and pin connection with one of said arms, substantially as described.

2. The combination with a car frame, of arms having their upper ends pivoted on said frame; wheel brakes rigidly secured on the lower ends of said arms; a bell crank lever pivoted at one end on the lower end of each of said arms; a track brake pivoted on the angular portion of each bell crank lever; a connection joining the other ends of said bell crank levers; and connecting links having pivotal connections with said bell crank levers and slot and pin connections with said arms.

In testimony whereof I have signed my name to this specification in the presence of two subscribing witnesses.

HARRY C. CONROY.

Witnesses:
JOSHUA R. H. POTTS,
B. G. RICHARDS.

Copies of this patent may be obtained for five cents each, by addressing the "Commissioner of Patents, Washington, D. C."